US012490178B2

(12) United States Patent
Huda et al.

(10) Patent No.: US 12,490,178 B2
(45) Date of Patent: Dec. 2, 2025

(54) FACILITATING RADIO ACCESS NETWORK ON-DEMAND DYNAMIC BANDWIDTH ALLOCATION IN ADVANCED NETWORKS

(71) Applicant: AT&T Intellectual Property I, L.P., Atlanta, GA (US)

(72) Inventors: Eshrat Huda, Hillsborough, NJ (US); Moshiur Rahman, Marlboro, NJ (US); Prafulla Verma, Holmdel, NJ (US); David Lu, Irving, TX (US); Russell Fischer, Bernardsville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 680 days.

(21) Appl. No.: 17/817,492

(22) Filed: Aug. 4, 2022

(65) Prior Publication Data
US 2024/0049122 A1 Feb. 8, 2024

(51) Int. Cl.
H04W 4/00 (2018.01)
H04L 9/08 (2006.01)
H04W 28/16 (2009.01)
H04W 48/18 (2009.01)
H04L 5/00 (2006.01)

(52) U.S. Cl.
CPC ........... H04W 48/18 (2013.01); H04L 9/0852 (2013.01); H04W 28/16 (2013.01); H04L 5/0035 (2013.01)

(58) Field of Classification Search
None
See application file for complete search history.

(56) References Cited

U.S. PATENT DOCUMENTS

| 11,601,379 | B1* | 3/2023 | Cai | H04L 41/0896 |
| 12,267,205 | B2* | 4/2025 | Young | H04L 41/0895 |
| 2017/0079059 | A1* | 3/2017 | Li | H04W 16/02 |
| 2019/0387411 | A1* | 12/2019 | Choi | H04W 16/10 |
| 2021/0204187 | A1* | 7/2021 | Gu | H04W 28/06 |
| 2021/0235289 | A1* | 7/2021 | Fitch | H04W 72/542 |
| 2021/0368514 | A1* | 11/2021 | Xing | H04W 24/02 |
| 2021/0385741 | A1* | 12/2021 | Corston-Petrie | H04W 48/18 |
| 2022/0141913 | A1* | 5/2022 | Liu | H04L 12/141 |
| | | | | 370/329 |
| 2023/0062362 | A1* | 3/2023 | Sun | H04W 36/34 |
| 2023/0345307 | A1* | 10/2023 | Forsman | H04W 84/00 |
| 2024/0333398 | A1* | 10/2024 | Bush | H04L 9/0855 |

* cited by examiner

Primary Examiner — Bob A Phunkulh

(57) ABSTRACT

Facilitating radio access network on-demand dynamic bandwidth allocation in advanced networks is provided herein. Operations of a system include determining that a group of network slice resources associated with network equipment fail to satisfy a specification applicable to a user equipment. The operations can also include extracting a first group of resource blocks from a first network slice resource of the group of network slice resources. Further, the operations can include reallocating the first group of resource blocks to a second network slice resource of the group of network slice resources. A combination of the first group of resource blocks and a second group of resource blocks of the second network slice resource is determined to satisfy the specification applicable to the user equipment.

20 Claims, 11 Drawing Sheets

FACILITATING RADIO ACCESS NETWORK ON-DEMAND DYNAMIC BANDWIDTH ALLOCATION IN ADVANCED NETWORKS

TECHNICAL FIELD

This disclosure relates generally to the field of mobile communications and, more specifically, to bandwidth allocation among network slices in advanced networks, e.g., fifth generation (5G), sixth generation (6G), new radio, and/or other advanced communication networks and protocols.

BACKGROUND

The use of computing devices is ubiquitous and users of such devices demand ever increasing network capability and functionality. In an attempt to meet the user needs, network slicing is utilized. In non-sliced networks, some devices have access to more resources than those devices can consume, resulting in excessive resources. In sliced networks, the excessive resources can be used by other devices. Further, slicing allows for the control of traffic resources on a more granular level. Each slice of network traffic can have its own resource requirements (e.g., Quality of Service, latency, security configurations, and so on). Thus, allocation of bandwidth in these sliced networks is important. Accordingly, unique challenges exist to provide efficient and dynamic bandwidth allocations in sliced networks and in view of forthcoming 5G, 6G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
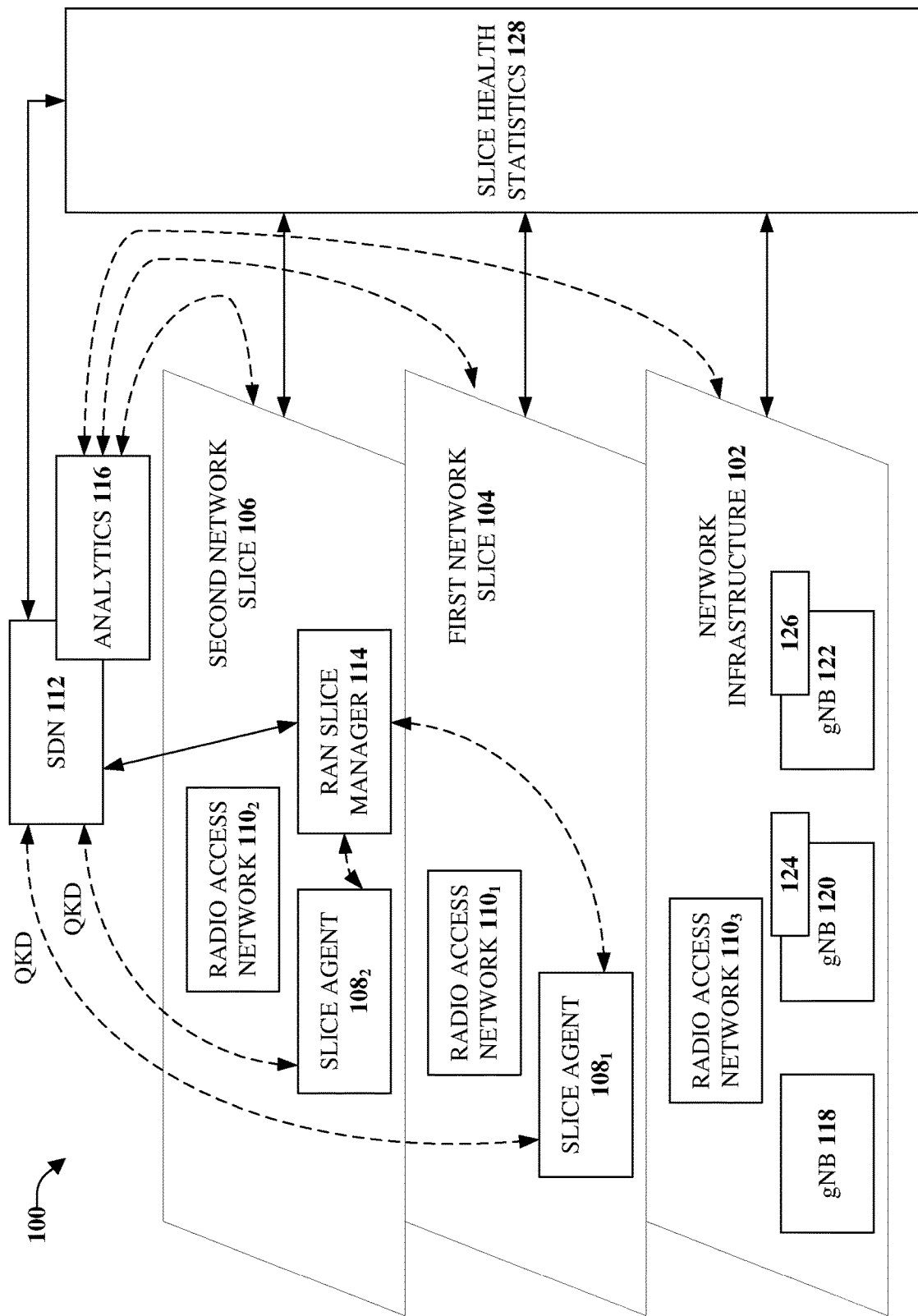
FIG. 1 illustrates an example, non-limiting, system that facilitates radio access network on-demand dynamic bandwidth allocation in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Analytics based Software-Defined Networking (SDN) dynamic slice bandwidth allocation method that employs fast and secure link, Quantum Key Distribution (QKD), does not exist in any wireless technology (e.g., 5G, 6G, and so on). Instead, in order to reallocate Resource Blocks (RBs) among the slices for the users, a RAN Slice Manager supporting multiple native slice agents (SA) resides in each slice and/or a RAN Slice Manager (hub), that interacts with a central intelligent node, such as SDN with analytics capability which will act upon a defined operating principle (algorithm) to find unused bandwidth of the native slice or inter-slice in real time. Currently, 5G is supporting a very rudimentary slicing concept, which is network slicing. There is no intelligent on-demand slice bandwidth allocation in the conventional implementation. Further, the Third Generation Partnership Project (3GPP) dictates that the network will be based on a central cloud that is connected via a backhaul network to many edge computing clouds that are kilometers away from the user and move many services from the core to the Edge. There is no specificity in terms of implementation. No specific realization method is defined to meet dynamic slice bandwidth availability determination and allocation that leverage analytics based SDN over a fast secure communication link, such as QKD. Accordingly, described herein are systems, methods, articles of manufacture, and other embodiments or implementations that can facilitate RAN on-demand dynamic bandwidth allocation in advanced networks.

Advantages and benefits of the disclosed embodiments include, but are not limited to, network robustness and improved Service Level Agreement (SLA) guarantee and service differentiation. Further, the disclosed embodiments can provided improved Quality of Service (QoS) and improved user experience (e.g., user satisfaction). The disclosed embodiments can also facilitate future analytics, SDN, quantum based slice management, and/or more edge automation.

According to an embodiment, a method can include, based on a first determination that available network slice resources fail to satisfy a criterion associated with a user equipment parameter associated with a user equipment, invoking, by network equipment comprising a processor, a reallocation procedure. The reallocation procedure can include extracting, by the network equipment, a defined amount of resource blocks from respective slices of the available network slice resources. The reallocation procedure can also include, based on a second determination that, after the extracting, a sum of unused resource blocks of the respective slices satisfy the criterion associated with the user equipment parameter, discontinuing, by the network equipment, the extracting of the defined amount of resource blocks. In an example, the extracting can be based on a defined slice weight of the respective slices according to some implementations.

In accordance with some embodiments, the method can include, prior to the extracting and based on inter-slice functionality being activated in a slicing parameterization, determining, by the network equipment, that a network slice of the respective slices of the available network slice resources has available unused resource blocks.

In some implementations, the network equipment is first network equipment and the method further includes, prior to the extracting, determining, by the first network equipment, that inter-slice functionality is not enabled in a slicing parameterization. The method also includes, facilitating, by the first network equipment, a transmission of an instruction to the user equipment. The instruction can direct the user equipment to second network equipment.

In some implementations, the user equipment is a first user equipment, the first user equipment and a second user equipment are serviced by a network slice of the available network slice resources, and the method further includes determining, by the network equipment, that intra-slice sharing is activated. The method also includes reconfiguring, by the network equipment, resource blocks of the network slice and a scheduling procedure between the first user equipment and the second user equipment.

Further to the above implementations, the method can include obtaining, by the network equipment, information indicative of settings associated with a parameterization that is defined based on the reconfiguring. The method also can include applying, by the network equipment, the parameterization at the available network slice resources.

In accordance with some implementations, the method can include, prior to the invoking, identifying, by the network equipment, the available network slice resources. The method can also include, based on a defined granularity level, performing, by the network equipment, fronthaul network slicing configuration.

Further to the above implementations, performing the fronthaul network slicing configuration occurs during a background mode. This can result in a reduced processing load consumed by the network equipment.

The method can include, according to some implementations, initiating, by the network equipment, a quantum key distribution link protocol. The method can also include establishing, by the network equipment, a quantum channel among the network equipment. In an example, establishing the quantum channel can include establishing the quantum channel via a satellite link. In another example, establishing the quantum channel can include establishing the quantum channel via a fiber link.

Another embodiment relates to a system that includes a processor and a memory that stores executable instructions that, when executed by the processor, facilitate performance of operations. The operations can include determining that a group of network slice resources associated with network equipment fail to satisfy a specification applicable to a user equipment. The operations can also include extracting a first group of resource blocks from a first network slice resource of the group of network slice resources. Further, the operations can include reallocating the first group of resource blocks to a second network slice resource of the group of network slice resources. A combination of the first group of resource blocks and a second group of resource blocks of the second network slice resource is determined to satisfy the specification applicable to the user equipment.

According to some implementations, the operations can include, prior to the extracting, determining an inter-slice functionality is enabled in a slicing parameterization. Further, based on the slicing parameterization being enabled, the operations can include determining that the first network slice resource has first available unused resource blocks and that the second network slice resource has second available unused resource blocks.

In an example, extracting of the first group of resource blocks is based on a defined slice weight of the first group of resource blocks as compared to a total amount of resource blocks available at the first network slice resource.

In some implementations, the user equipment is a first user equipment and the operations include determining that intra-slice sharing among the first user equipment and a second user equipment has been activated. Further to these implementations, the operations include reconfiguring a scheduling procedure associated with the combination of the first group of resource blocks and the second group of resource blocks between the first user equipment and the second user equipment.

According to some implementations, the operations include initiating a quantum key distribution link protocol at the network equipment and establishing a quantum channel between the network equipment. In some implementations, the network equipment is configured to operate according to at least a fifth generation network communication protocol. In some implementations, the network equipment is configured to operate according to a sixth generation network communication protocol.

A further embodiment relates to a non-transitory machine-readable medium, comprising executable instructions that, when executed by a processor of network equipment, facilitate performance of operations. The operations include evaluating network slice resources that are available to fulfill an operating requirement of a user equipment and, based on the evaluating indicating that the operating requirement is not satisfied, extracting first resource blocks from a first network slice resource of the network slice resources and second resource blocks from a second network slice resource of the network slice resources. The operations also include, based on a determination that a total amount of unused resource blocks of the first network slice resource and the second network slice resource after the extracting satisfies the operating requirement, reallocating the unused resource blocks for use by the user equipment. In an example, the extracting is based on a first slice weight of the first network slice resource and a second slice weight of the second network slice resource.

In further detail, FIG. 1 illustrates an example, non-limiting, system 100 that facilitates radio access network on-demand dynamic bandwidth allocation in accordance with one or more embodiments described herein. It is noted that various embodiments are discussed with respect to a fifth generation network communication protocol (e.g., 5G), however, the disclosed aspects are not limited to this implementation. Instead, the disclosed embodiments can be implemented in a 5G network communication protocol, a sixth generation (6G) network communication protocol, a New Radio (NR) communication protocol, and/or other advanced communication protocols.

Aspects of systems (e.g., the system 100 and the like), equipment, User Equipment (UE), network equipment, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

As illustrated, the system 100 includes a network infrastructure 102, a first network slice 104, and a second network slice 106. It is noted that although only two network slices are illustrated and described for purposes of simplicity, the system can include more than two network slices. Further, the system 100 includes other components not depicted in FIG. 1 for purposes of simplicity.

The system 100 (and other embodiments described herein) can be configured for RAN (e.g., 5G RAN, 6G RAN, and so on) on-demand dynamic slice bandwidth allocation by leveraging analytics enabled SDN employing fast and secure quantum links. More specifically, the disclosed embodiments provide an efficient way to allocate required slice bandwidth on-demand by leveraging analytics-backed SDN that determines the available unused bandwidth for inter-slice and intra-slice clusters by constant (or continual) real time monitoring and analyzing the current and projected traffics for any specific slice in the RAN. Then the SDN allocates the needed bandwidth to end users (UEs) by interacting with the RAN slice agent or RAN slice manager over a fast and secure connection employing QKD (Quantum Key Distribution) link protocol.

The terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

The network slices include respective Slice Agents (SAs), illustrated as a first SA $108_1$ in the first network slice 104 and a second SA $108_2$ in the second network slice 106. In order to reallocate Resource Blocks (RB) among the slices (e.g., the first network slice 104, the second network slice 106) for any user equipment, a RAN supporting multiple slice agents (SA) resides in each slice (illustrated as a first RAN $110_1$ in the first network slice 104, a second RAN $110_2$ in the second network slice 106, and a third RAN $110_3$ in the network infrastructure 102). The respective RANs (e.g., the first RAN $110_1$, the second RAN $110_2$, the third RAN $110_3$) interface with an Software-Defined Networking controller (SDN 112), as illustrated by the dotted lines. The SDN 112 is configured to operate based on a defined operating principle and/or process to evaluate and determine unused bandwidth of the slices (e.g., the first network slice 104, the second network slice 106) in the respective RANs (e.g., the first RAN $110_1$, the second RAN $110_2$). It is noted that the SDN 112 is included in network equipment and has a global view of the RAN slices.

Upon or after the SDN 112 determines there is unused bandwidth, a RAN Slice Manager (RSM) invokes a reallocation procedure based upon a slice not fulfilling at least one criterion associated with one or more service parameters and/or at least one criterion associated with service requirements for incoming UEs to access the slice. Although the RSM 114 is illustrated as being included in the second network slice 106, the RSM 114 can be located in any network slice and only one RSM is needed for all network slices in the system 100. The system 100 communicates with the Edge cloud and SDN 112 for efficient slice management.

In accordance with an implementation, for each slice belonging to the 5G gNB, the RSM 114 determines the amount of RBs (Slice X) needed. If at least one slice has available unused RBs (Slice X free res), the RSM 114 monitors if the inter-slice functionality is enabled in the slicing parameterization, otherwise the UE is redirected to another gNB. When the inter-slice functionality is active, the RSM 114 extracts a certain amount of RBs from each slice according to a specific slice weight (Slice X w), until the sum of unused RBs from each slice is greater or equal to the minimum UE requirements.

Another functionality described herein is the intra-slice sharing. If active, the RSM 114 reconfigures the RBs and the scheduling procedure among the UEs served within the same slice.

Additionally, analytics 116 can be configured to monitor the network infrastructure 102, the first network slice 104, the second network slice 106, and other network slices. The monitoring by the analytics 116 can be in the form of a feedback loop such that as dynamic bandwidth allocation is implemented, information related to the result of such implementation can be analyzed for future allocation and/or retained as historical information. The SDN 112 and analytics 116 can operate independently and/or in conjunction with one another.

Further, as illustrated, the network infrastructure 102 comprises a group of network equipment, illustrated as a first gNB 118, a second gNB 120, and a third gNB 122. The second gNB 120 comprises a first instantiation 124 that corresponds to a first instance of the RSM associated with one of the network slices (e.g., the first network slice 104). Further, the third gNB 122 comprises a second instantiation 126 that corresponds to a second instance of the RSM associated with another one of the network slices (e.g., the second network slice 106). Further, according to some implementations, slice health statistics 128 can be continually monitored.

The slice bandwidth allocation discussed herein provides users flexibility, security, simplicity, and network performance tailored to specific and demanding requirements, such as on-demand desired/needed bandwidth. Further, the disclosed embodiments allow a service provider to meet SLA and the users' stringent and flexible on-demand service requirements. As such, the Artificial Intelligence (AI) analytics based SDN controlled slicing bandwidth management can enable a service provider to tailor the pricing dynamically, while maximizing and monetizing the value of network slicing.

The network slicing concept in 5G enables tenants to obtain different levels of connectivity from their service provider to accommodate the static needs. To achieve the network slicing, 5G is an all-cloud architecture. The specifications provided by 3GPP dictate that the network is to be based on a central cloud that is connected via a backhaul network to many edge computing clouds that are kilometers away from the user and move many services from the core to the Edge. However, 3GPP does not define a specific implementation process to meet dynamic real time slice bandwidth determination and allocation that leverages AI analytic based SDN and fast secure quantum link (QKD), which is provided herein. The disclosed embodiments can efficiently manage slicing bandwidth employing dynamic SDN control employing secure quantum QKD link with RAN.

The procedure for RAN on-demand dynamic bandwidth allocation have various portions. These portion include UE acceptance and service requirement analysis; statistical analysis and slice configuration by, for example, a central node; background real-time dynamic system optimization for the optimal resource balancing among the slices; and Quantum link QKD. Further details related to these portions and the related capabilities will now be described.

For the avoidance of doubt, any embodiments described herein in the context of optimizing bandwidth allocation and/or system resources are not so limited and should be considered also to cover any techniques that implement underlying aspects or parts of the described aspects to improve or increase optimizing bandwidth allocation and/or system resources, even if resulting in a sub-optimal variant obtained by relaxing aspects or parts of a given implementation or embodiment.

Figure 2:
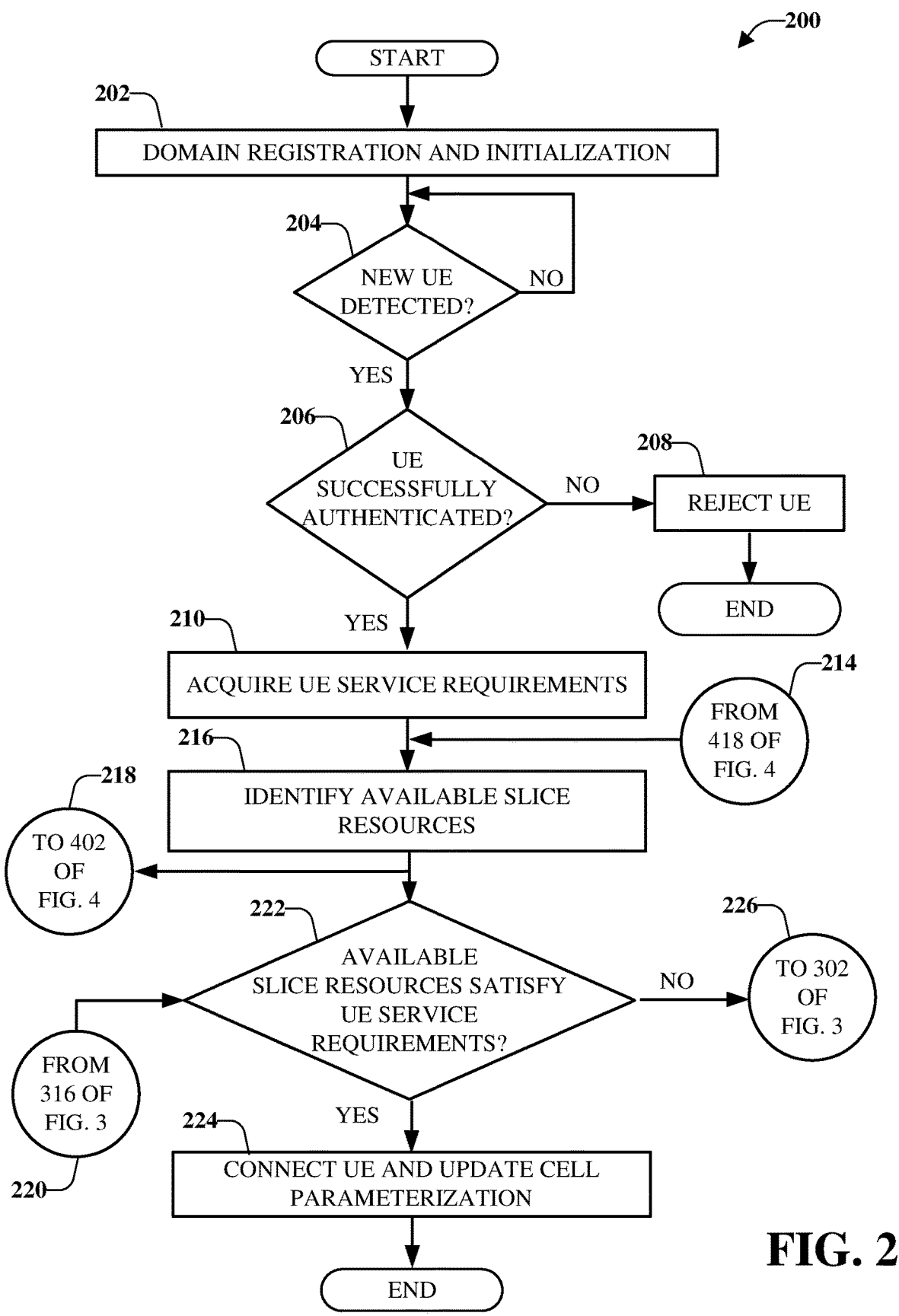
FIG. 2 illustrates an example, non-limiting, computer-implemented method for dynamic slice bandwidth for UE acquisition in accordance with one or more embodiments described herein.

FIG. 2 illustrates an example, non-limiting, computer-implemented method 200 for dynamic slice bandwidth for UE acquisition in accordance with one or more embodiments described herein. Repetitive description of like elements employed in other embodiments described herein is omitted for sake of brevity. The computer-implemented method 200 can be implemented by a system including a memory and a processor, user equipment including memory and a processor, network equipment including a memory and a processor, a network controller including a memory and a processor, or another computer-implemented device including a memory and a processor.

The computer-implemented method 200 starts at 202 with domain registration and initialization for a communication network (e.g., network equipment). For example, the UE domain is registered and the RAN domain and CN domain are initialized. Further, during the domain registration and initialization, default slice parametrization can be loaded, such as in a data store, in memory, in storage, and so on.

At 204, a determination is made whether a new UE (e.g., an incoming UE) is detected. For example, the detection can be based on a new UE entering the communication network and/or a new UE being activated within the communication network. If a new UE is not detected ("NO"), the computer-implemented method 200 continues to monitor, at 204, until a new UE is detected.

Upon or after a new UE is detected at 204 ("YES"), an authentication procedure can be activated. In an example, the authentication procedure can be activated based upon receipt of a connection request from the UE, which is received at network equipment (e.g., a gNB). At 206 another determination is made whether the UE has been successfully authenticated with the communication network. For example, it can be determined whether authentication parameters of the new UE match a configuration of a subscriber authentication function of the communication network. If the determination at 204 is that the UE has not been successfully authenticated with the communication network ("NO"), at 208 the UE is rejected (e.g., a connection request from the UE is denied) and the computer-implemented method 200 ends.

Alternatively, if the determination at 206 is that the UE has been successfully authenticated with the communication network ("YES"), the UE authentication procedures do match the configuration of subscriber authentication function of the network equipment. Therefore, the connection request is accepted and an initialization messaging phase is activated between the UE and the network equipment. According to an implementation, the UE can activate the initialization messaging phase.

At 210 UE service and/or traffic requirements (UE_req), also referred to as service and/or traffic specifications, are obtained, which can be during the initialization messaging phase. By way of example and not limitation, the UE service and/or traffic requirements can be received from the new UE and/or from other equipment (e.g., network equipment). Information indicative of the UE service and/or traffic requirements can include, but are not limited to, traffic priority, average packet size, maximum packet delay, isolation restrictions and type of service (e.g., UE request).

Upon or after receipt of the information indicative of the UE service and/or traffic requirements, as well as input data 214 (which is output data 418 of a computer-implemented method 400, which will be discussed in further detail below with respect to FIG. 4), available slice resources (Slice_X_res(t)) are identified, at 216. For example, the information indicative of the UE service requirements can be utilized by the network equipment (e.g., the RSM 114 in collaboration with the SDN 112) to determine the appropriate slice for the UE and the resources needed (Slice X res) can be quantified for the correct service supply. Information indicative of the slice and its quantification can be output (as output data 218) and used as input data 402 for the computer-implemented method 400, which will be discussed further below with respect to FIG. 4.

Further, based on the information indicative of the slice and its quantification and input data, received at 220 (which is output data 316 of a computer-implemented method 300, which will be discussed in further detail below with respect to FIG. 3), at 222 a determination can be made whether the UE requirements are satisfied. For example, the determination can be whether the available slice resources guarantee a proper service (e.g., satisfy or are more than or equal to) the UE service requirements (e.g., Slice_X_res(t)>= UE_req)). If the available slice resources satisfy the UE service requirements ("YES"), at 224, the UE is connected and the cell parameterization is updated and the computer-implemented method 200 ends. Alternatively, if the determination at 222 is that the UE requirements are not satisfied ("NO"), a reallocation resource procedure is implemented at 226 (which is input data 302 of the computer-implemented method 300, which will be discussed in further detail below with respect to FIG. 3).

Figure 3:
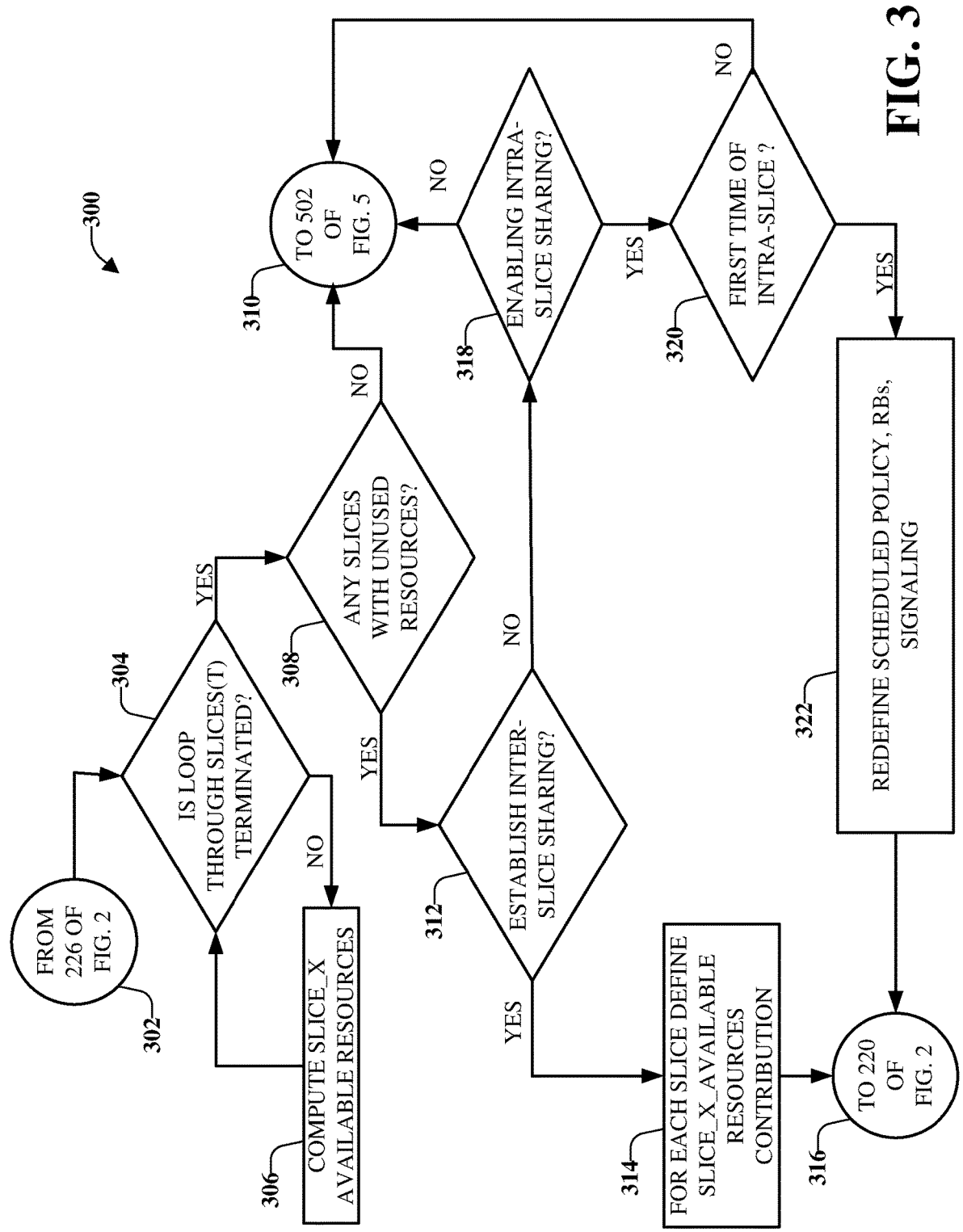
FIG. 3 illustrates an example, non-limiting, computer-implemented method for dynamic slice bandwidth for slice configuration in accordance with one or more embodiments described herein.

FIG. 3 illustrates an example, non-limiting, computer-implemented method 300 for dynamic slice bandwidth for slice configuration in accordance with one or more embodiments described herein. Repetitive description of like elements employed in other embodiments described herein is omitted for sake of brevity. The computer-implemented method 300 can be implemented by a system including a memory and a processor, user equipment including memory and a processor, network equipment including a memory and a processor, a network controller including a memory and a processor, or another computer-implemented device including a memory and a processor. According to some implementations, the computer-implemented method 300 can be implemented by the RSM 114 of FIG. 1.

The computer-implemented method 300 can be utilized to reallocate the Resource Blocks (RBs) among the slices. For example, the computer-implemented method 300 can facilitate analytics-enabled analysis and slice configuration. The reallocation procedure can be activated (e.g., by the RSM 114) when a slice does not fulfill the service requirements of the incoming UE (e.g., as determined at 222 of FIG. 2). According to some implementations, the RSM system (e.g., the RSM 114) can communicate with the RAN and CN domains through, for example, a 5G CP specification, which can ensure compliance with the 3GPP standard solution.

The computer-implemented method 300 receives, as input data 302, output data 226 from the computer-implemented method 200 of FIG. 2. Based on the input data, at 304 a determination is made whether a loop through the slices has been terminated. If the loop has not been terminated ("NO"), at 306, the computer-implemented method 300 computes slice_X available resources. Upon or after computing the available resources, the computer-implemented method 300 returns to 304 for another determination whether a loop through the slice has been terminated.

If the loop through the slices has been terminated ("YES"), at 308, for each slice belonging to the network equipment (e.g., the gNB), the computer-implemented method 300 RSM determines the amount of RBs (Slice X) and whether at least one slice has available unused RBs (Slice X free res). If there are no slices with unused RBs ("NO"), the UE is redirected to another network equipment (e.g., another gNB) and data indicative of this determination is output (as output data 310), which is input data 502 of a computer-implemented method 500, which will be discussed further with respect to FIG. 5.

Alternatively, if there is at least one slice with unused RBs ("YES"), at 312 the computer-implemented method 300 determines if the inter-slice functionality is enabled in the slicing parameterization. When the determination is that the inter-slice functionality is enabled ("YES") and while the inter-slice functionality is active, a defined number of RBs are extracted from each slice according to a defined slice weight (Slice X w). Thus, at 314, for each slice the computer-implemented method 500 defines Slice_X available resources contribution. The RBs are extracted until a sum of the unused RBs from each slice is greater or equal to the minimum UE req requirements. The resulting data is output (as output data 316), which is received as input data 220 of FIG. 2.

According to some implementations, if it is determined that inter-slice sharing is not to be enabled at 312 ("NO"), a determination is made, at 318, whether intra-slice sharing should be enabled. If not ("NO"), information related to this determination is output at 310. However, if the determination at 318 is "YES," intra-slice sharing is enabled, at 320, it is determined if this is the first time intra-slice sharing has been enabled. If not, the determination at 320 is output at 310.

Alternatively, if this is the first time intra-slice sharing has been enabled ("YES"), at 322, the scheduled policies, RBs, and/or signaling are redefined, which is added to the output data 316. For example, the computer-implemented method 300 can reconfigure the RB s and the scheduling procedure among the UEs served within the same slice. The new parameterization obtained from the reallocation procedure is translated in a 5G communication protocol (CP)-compliant file format (or other communication protocol compliant file format). The compliant file format can be sent from the RSM to the SDN controller, for example. The SDN controller communicates the new settings to the corresponding gNB SDN RSM or agent (SA), which applies the new system changes.

Figure 4:
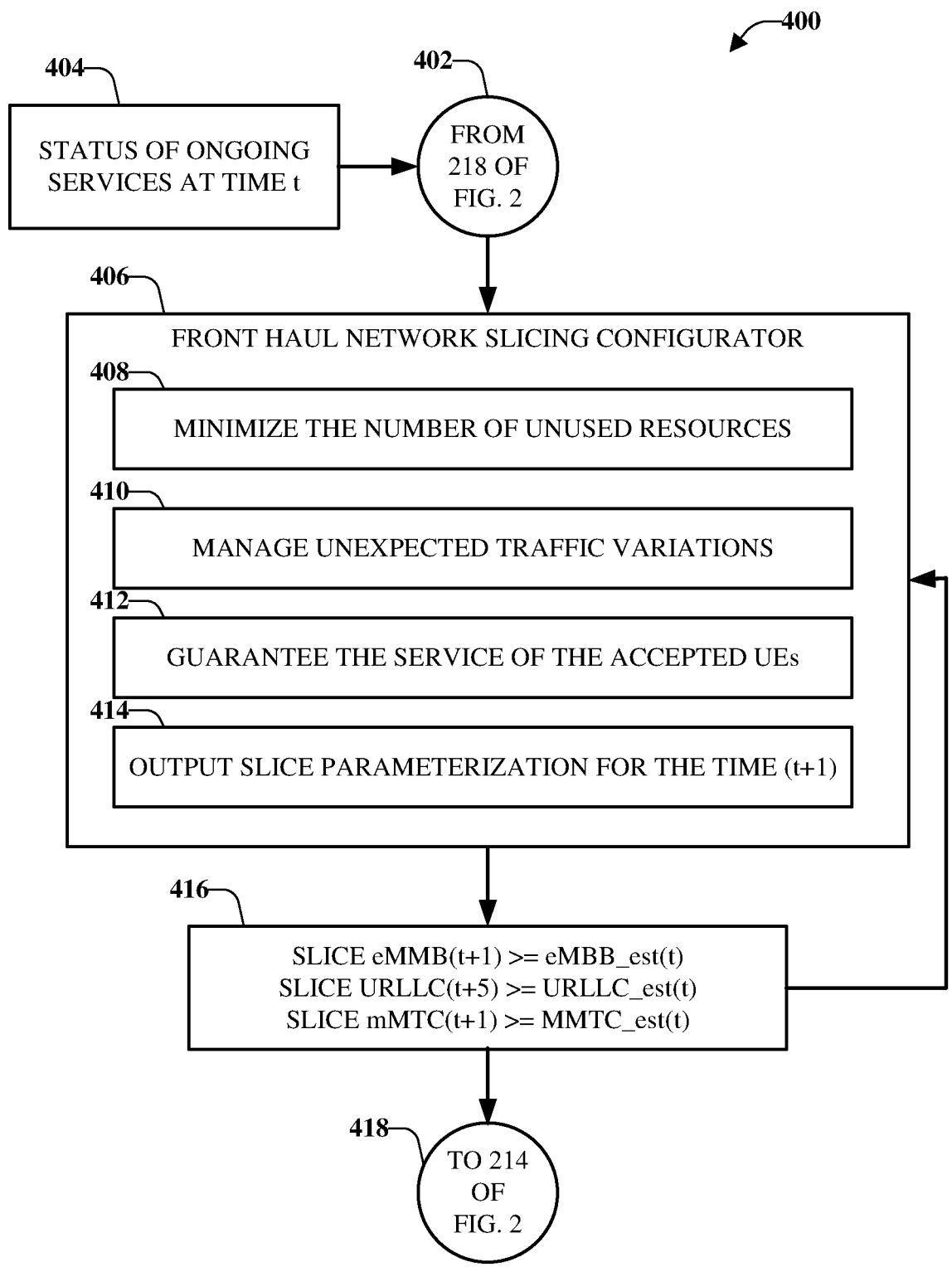
FIG. 4 illustrates an example, non-limiting, computer-implemented method for dynamic slice bandwidth for system runtime optimization in accordance with one or more embodiments described herein.

FIG. 4 illustrates an example, non-limiting, computer-implemented method 400 for dynamic slice bandwidth for system runtime optimization in accordance with one or more embodiments described herein. Repetitive description of like elements employed in other embodiments described herein is omitted for sake of brevity. The computer-implemented method 400 can be implemented by a system including a memory and a processor, user equipment including memory and a processor, network equipment including a memory and a processor, a network controller including a memory and a processor, or another computer-implemented device including a memory and a processor. According to some implementations, the computer-implemented method 300 can be implemented by the RSM 114 of FIG. 1.

The computer-implemented method 400 can facilitate an optimal parameterization of the slices. Further, the computer-implemented method 400 can be executed in a background mode in order to reduce the processor (CPU) load.

At 402, input data related to identified available slice resources is received (e.g., output data 218 of FIG. 2). Further, the input data can include a start of ongoing services at time t 404. The computer-implemented method 400 (e.g., the RSM 114) adjusts the number of RBs until the estimated slice throughput is as close as possible to the measured real slice data rate. This can guarantee the allocation, according to the system granularity, of the optimal amount of RBs to each slice (Enhanced Mobile Broadband (eMBB), ultra-reliable low latency communications (URLLC), massive Machine Type Communications (mMTC), without the isolation of unused RBs. The computer-implemented method 400 allows the system to be always equipped with the optimal configuration in line with the services evolution. As a consequence, the delay due to the RB reconfiguration when a new connection request arrives is reduced, and a homogeneous resource distribution is applied among the slices.

According to a specific granularity (e.g., one frame length, less than a frame length, more than a frame length, multiple frame lengths), the output of the computer-implemented method 400 is the optimal slice parameterization by taking into account: i) the ongoing services, ii) the unpredictable traffic variations, iii) the release of RBs from UEs that completed the service session, and iv) the changes of the service type (e.g., from eMBB to URLLC) during an ongoing transmission for the same UE. The network equipment (e.g., the SDN 112 or SDN controller) communicates the new settings to the corresponding gNB SDN agent, SA, that applies the new system changes.

In further detail, at 406 front haul network slicing configuration is applied. This can include minimizing the number of unused resources at 408, managing unexpected traffic variations at 410, guaranteeing the service of the accepted UEs at 412, and outputting slice parameterization for the time (t+1). Further, at 416 the allocation of the defined amount of RBs to each slice (EMBB, URLLC, MMTC) is applied. Information indicative of the allocation can be output at 418 (and used as input data 214 of FIG. 2).

Figure 5:
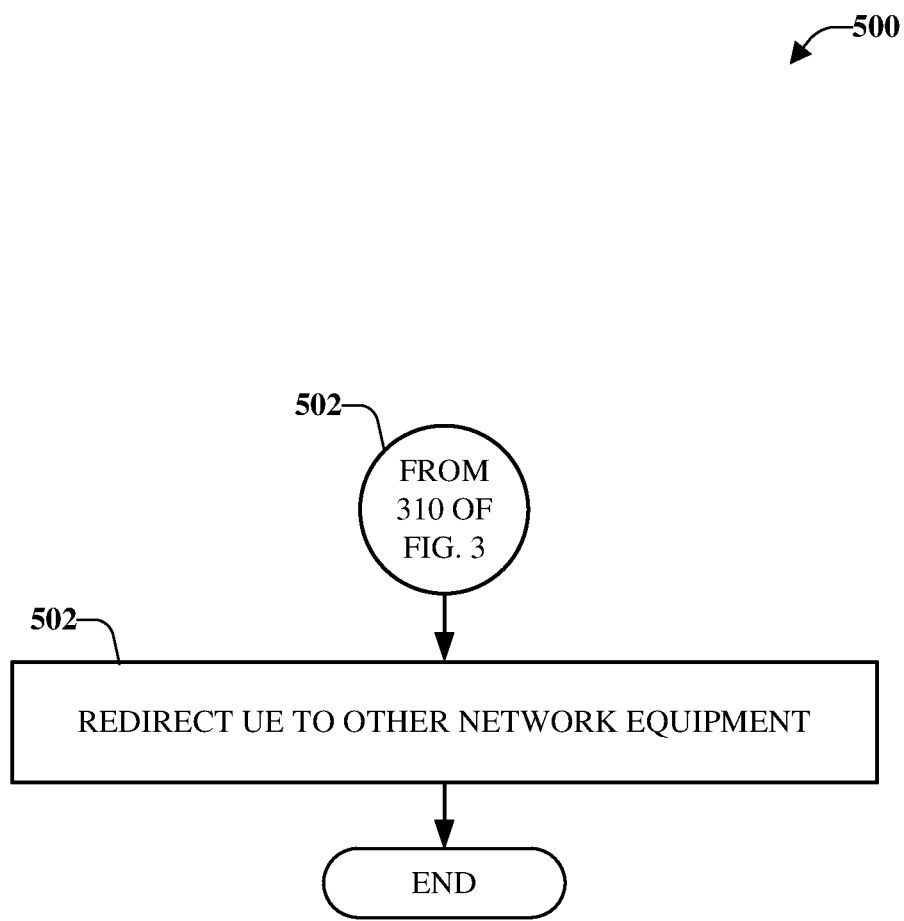
FIG. 5 illustrates an example, non-limiting, computer-implemented method for redirecting user equipment to other network equipment in accordance with one or more embodiments described herein.

FIG. 5 illustrates an example, non-limiting, computer-implemented method 500 for redirecting user equipment to other network equipment in accordance with one or more embodiments described herein. Repetitive description of like elements employed in other embodiments described herein is omitted for sake of brevity. The computer-implemented method 500 can be implemented by a system including a memory and a processor, user equipment including memory and a processor, network equipment including a memory and a processor, a network controller including a memory and a processor, or another computer-implemented device including a memory and a processor. According to some implementations, the computer-implemented method 500 can be implemented by the RSM 114 of FIG. 1.

Input data 502 for the computer-implemented method 500 can be output data 310 from the computer-implemented method 300 of FIG. 3. For example, the input data 502 can be based on a determination that there are no network slices that have unused resources for network equipment that is under consideration (e.g., 308 of FIG. 3). Alternatively, the input data can be based on a determination that intra-slice sharing is not enabled (e.g., 318 of FIG. 3). Alternatively, the input data can be based on a determination that, when intra-slice is enabled, that this is not the first time intra-slice has been enabled (e.g., 320 of FIG. 3).

Based on the input data 502, the UE can be directed to other network equipment (e.g., another eNB) for servicing of the UE. To direct the UE to other network equipment, a transmission of an instruction that directs the user equipment to the other network equipment can be output. For example, the instruction can include information indicative of an identification of the other network equipment.

Figure 6:
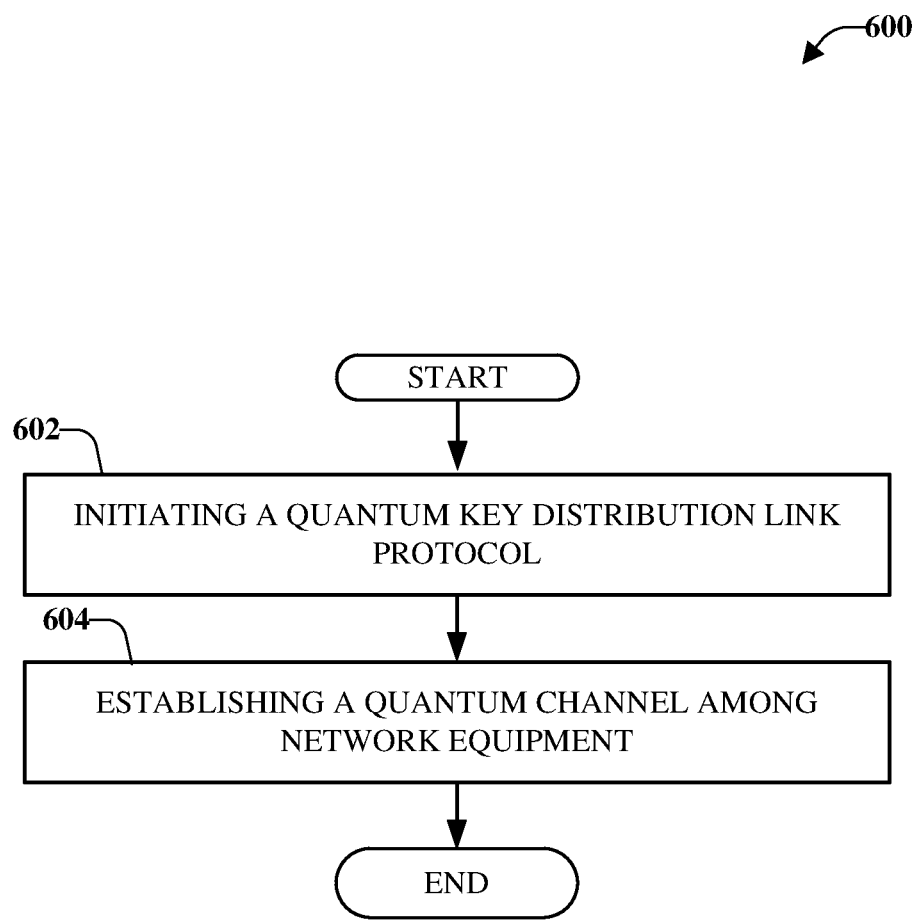
FIG. 6 illustrates an example, non-limiting, computer-implemented method for enabling quantum key distribution in accordance with one or more embodiments described herein.

FIG. 6 illustrates an example, non-limiting, computer-implemented method 600 for enabling quantum key distribution in accordance with one or more embodiments described herein. Repetitive description of like elements employed in other embodiments described herein is omitted for sake of brevity. The computer-implemented method 600 can be implemented by a system including a memory and a processor, user equipment including memory and a processor, network equipment including a memory and a processor, a network controller including a memory and a processor, or another computer-implemented device including a memory and a processor.

At 602, a quantum key distribution (QKD) link protocol can be initiated. For example, the QKD can be set up under control of network equipment (e.g., the SDN 112 of FIG. 1). Further, at 604, the computer-implemented method 600 can establish the quantum channel among the network equipment. Establishing the quantum channel can include establishing the quantum channel via a satellite link. Alternatively, or additionally, establishing the quantum channel can include establishing the quantum channel via a fiber link.

According to some implementations, upon confirmation of the available needed bandwidth, the SDN can initiate a QKD procedure to setup a Quantum channel with other network equipment (e.g., the RSM 114 of FIG. 1 and/or one or more slice agents (the first SA $108_1$ in the first network slice 104 and/or the second SA $108_2$ in the second network slice 106). As noted the quantum channel can be via a satellite link and/or via a fiber link.

Upon or after establishment of the quantum channel (or more than one quantum channel), the bandwidth allocation process is complete. According to some implementations, the establishment of the quantum channel can leverage (or can be utilized with) traditional slice orchestration processes associated with traditional 5G operation processes.

Figure 7:
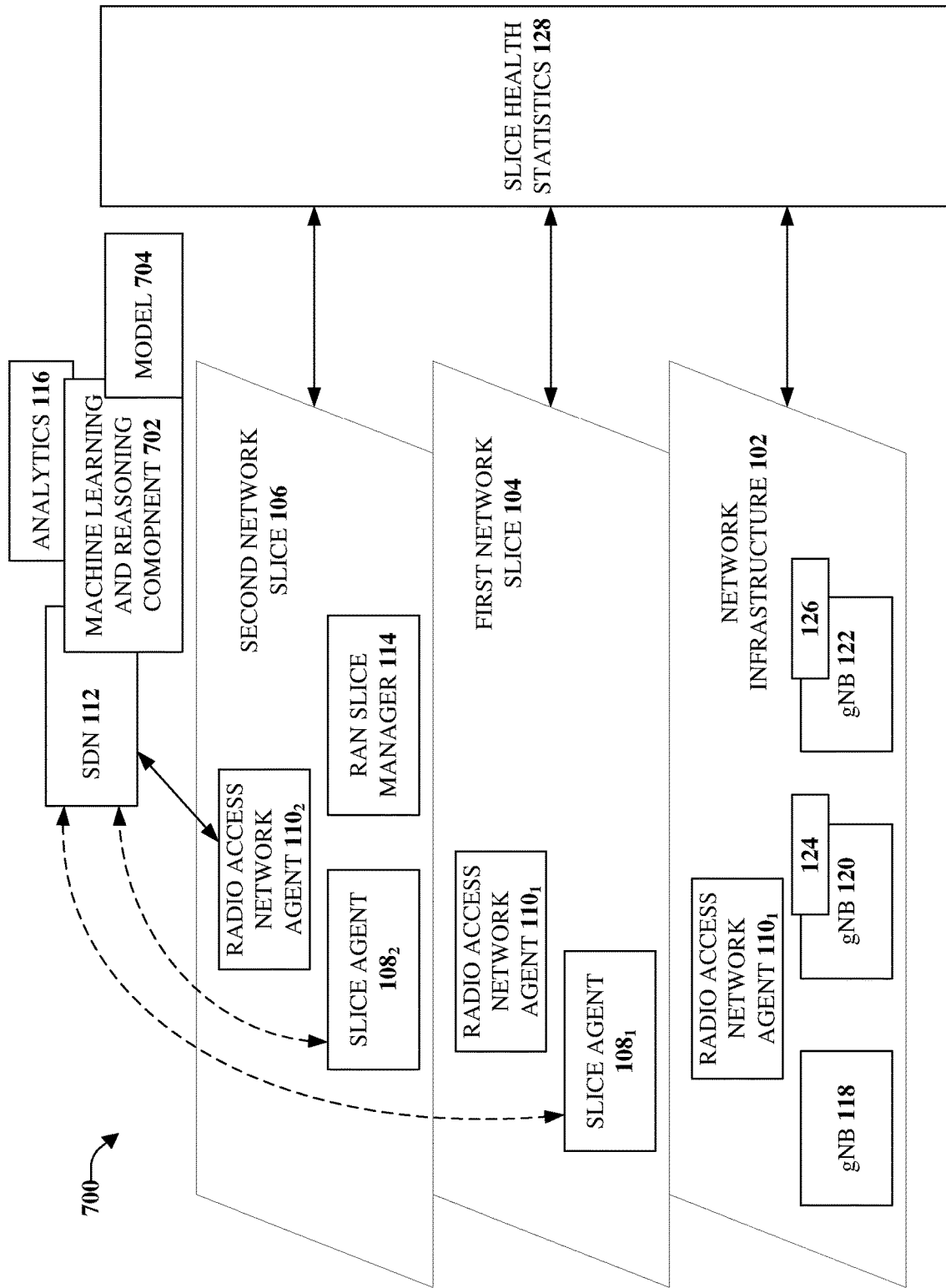
FIG. 7 illustrates an example, non-limiting, system that employs automated learning that trains a model to facilitate one or more of the disclosed aspects in accordance with one or more embodiments described herein.

FIG. 7 illustrates an example, non-limiting, system 700 that employs automated learning that trains a model to facilitate one or more of the disclosed aspects in accordance with one or more embodiments described herein. Repetitive description of like elements employed in other embodiments described herein is omitted for sake of brevity. The system 700 can comprise one or more of the components and/or functionality of the system 100, the computer-implemented method 200, the computer-implemented method 300, the computer-implemented method 400, the computer-implemented method 500, the computer-implemented method 600, and vice versa.

The system 700 can utilize machine learning to train a model to identify an opportunity to dynamically perform bandwidth allocation among various network slices of a communications network. The model can be trained to a defined confidence level. As illustrated, the system 700 can comprise a machine learning and reasoning component 702 that can be utilized to automate one or more of the disclosed aspects based on training a model 704. The machine learning and reasoning component 702 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 702 can employ principles of probabilistic and decision theoretic inference. Additionally, or alternatively, the machine learning and reasoning component 702 can rely on predictive models (e.g., the model 704) constructed using automated learning and/or automated learning procedures. Logic-centric inference can also be employed separately or in conjunction with probabilistic methods.

The machine learning and reasoning component 702 can infer whether available network slice resources satisfy one or more user equipment parameters (e.g., UE service requirements and/or UE traffic requirements). If the network slice resources fail to satisfy the one or more user equipment parameters, the machine learning and reasoning component 702 can determine which RB s should be allocated among the slices and facilitating reallocation of the RBs among the slices as discussed herein. Further, the machine learning and reasoning component 702 can determine priorities associated with the various user equipment and can facilitate allocation of the resource blocks and/or network slices based on the priorities. Based on this knowledge, the machine learning and reasoning component 702 can make an inference based on when to activate bandwidth allocation, when to establish one or more QKD links (e.g., via satellite, via fiber), and so on.

As used herein, the term "inference" refers generally to the process of reasoning about or inferring states of a system, a component, a module, an environment, and/or devices from a set of observations as captured through events, reports, data and/or through other forms of communication. Inference can be employed to identify when corrective measures, such as reallocating bandwidth on demand, performing background real-time dynamic system optimization for the best possible resource balancing among network slices, when to instruct a UE to move to another set of network equipment if a current network equipment cannot satisfy parameters of the UE, and so on. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with radio access network on-demand dynamic bandwidth allocation in 5G communication networks, 6G communication networks, new radio communication networks, and/or other advanced networks) can employ various artificial intelligence-based schemes for carrying out various aspects thereof. For example, a process for determining if one or more network slices are available (or are expected to be available) to fulfill various services and/or traffic parameters for one or more UEs, performing inter-slice sharing based on the inter-slice sharing being enabled, performing intra-slice sharing based on the intra-slice sharing being enabled, and so on can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to perform UE acceptance and service needs analysis, perform statistical analysis and slice configuration, perform real-time dynamic system optimization for the best possible resource balancing among the network services, and/or quantum link QKD.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing equipment feedback associated with dynamic bandwidth allocation by receiving implicit information, based on an inference, and so on. For example, SVMs can be configured through a learning or training phase within a classifier constructor and feature selection module. Thus, a classifier(s) can be used to automatically learn and perform a number of functions, including but not limited to determining, according to a predetermined criterion, when to allocate resources, how to allocate the resources, when to handoff a user equipment to other network equipment, when to adjust a previous allocation, and so forth. The criteria can include, but is not limited to, historical information, feedback information, measured amounts of bandwidth allocation, measured signal information (e.g., QoS, power levels, and so on), evaluation of SLAs, user preferences, and so forth.

Additionally, or alternatively, an implementation scheme (e.g., a rule, a policy, and so on) can be applied to control and/or regulate bandwidth allocation and/or network slice allocation, including intra-slice sharing and/or inter-slice sharing, and so forth. In some implementations, based upon a predefined criterion, the rules-based implementation can automatically and/or dynamically interpret priority of user equipment and/or restricting one or more network slices for use by a user equipment. In response thereto, the rule-based implementation can automatically interpret and carry out functions associated with bandwidth allocation by employing a predefined and/or programmed rule(s) based upon any desired criteria.

In further detail, the system 700 can continually monitor network equipment, network slices, and/or user equipment performance to determine if bandwidth allocation should be applied (e.g., via the machine learning and reasoning component 702). The system can detect one or more signals from the user equipment and/or network equipment. The machine learning and reasoning component 702 can facilitate execution of a process that analyzes the data. Based, at least in part, on the data, the machine learning and reasoning component 702 can determine when bandwidth allocation should occur, the amount of bandwidth to be allocated various equipment, an order in which the user equipment should be allocated bandwidth, whether equipment should be moved to facilitate fulfillment of UE requirements, and so on. Depending on the decision, the system 700 (e.g., through its various components) can facilitate bandwidth allocation. According to some implementations, the machine learning and reasoning component 702 can, depending on the respective user equipment, execute a machine learning process that can introduce and/or remove user equipment as candidates to receive allocated resources of the network equipment.

According to some implementations, seed data (e.g., a data set) can be utilized as initial input to the model 704 to facilitate the training of the model 704. In an example, if seed data is utilized, the seed data can be obtained from one or more historical data associated with network slices, UE traffic specification, UE service specification, and/or other information indicative of allocation of bandwidth in the communication network. However, the disclosed embodiments are not limited to this implementation and seed data is not necessary to facilitate training of the model 704. Instead, the model 704 can be trained on new data received (e.g., the input signals, a feedback loop, and so on).

The data (e.g., seed data and/or new data) can be collected and, optionally, labeled with various metadata. For example, the data can be labeled with an indication of the communication protocol being utilized for communication amongst the equipment, respective applications executing on the equipment, or other data, such as identification of respective equipment and the associated conditions and/or parameters expected at the UE, and so on.

Figure 8:
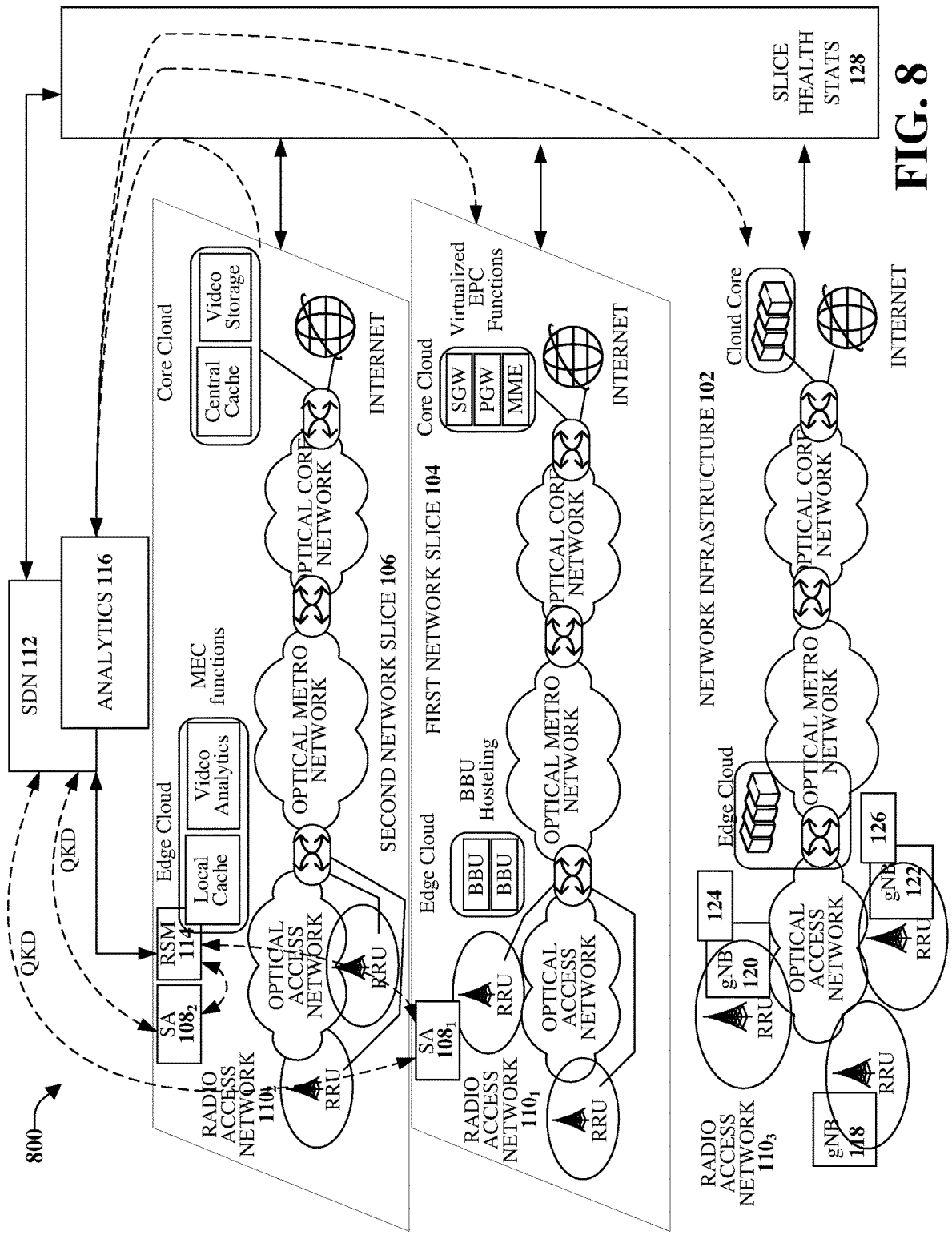
FIG. 8 illustrates another example, non-limiting, system that facilitates radio access network on-demand dynamic bandwidth allocation in accordance with one or more embodiments described herein.

FIG. 8 illustrates another example, non-limiting, system 800 that facilitates radio access network on-demand dynamic bandwidth allocation in accordance with one or more embodiments described herein. Repetitive description of like elements employed in other embodiments described herein is omitted for sake of brevity. The system 800 can comprise one or more of the components and/or functionality of the system 100, the computer-implemented method 200, the computer-implemented method 300, the computer-implemented method 400, the computer-implemented method 500, the computer-implemented method 600, the system 700, and vice versa.

As discussed, network slicing is utilized in order to meet user equipment parameters (e.g., service requirements, traffic requirements, and other requirements). Network slicing allows for the control of traffic resources on a more granular level as compared to a non-sliced network. Each slice of network traffic can have its own resource capabilities (e.g., Quality of Service, latency, security configurations, and so on). Accordingly, one or more network slices and/or resource blocks associated with the one or more network slices can be dynamically allocated as discussed herein.

As illustrated in FIG. 8, the system 800 includes a network infrastructure 102, a first network slice 104, and at least a second network slice 106. The network infrastructure 102, the first network slice 104, and the second network slice 106 comprise radio access networks. Further, the first network slice 104 and the second network slice 106 comprise respective slice agents, which can communicate with the SDN 112. The RSM 114 can be included in at least one network slice (illustrated in FIG. 8 as being in the second network slice 106).

In various embodiments, the SDN 112, the RSM 114, the respective SAs, other components, other equipment, and so on, can be any type of component, machine, device, facility, apparatus, and/or instrument that includes a processor and/or can be capable of effective and/or operative communication with a wired and/or wireless network. Components, machines, apparatuses, devices, facilities, and/or instrumentalities that can include the SDN 112, the RSM 114, the respective SAs, other components, other equipment, and so on, can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like. Further, according to some implementations, UEs, other equipment, and so on can be classified as Internet of Things (IoT) devices, as Internet of Everything (IoE) devices, electric vehicles (including unmanned vehicles, which can be unmanned aerial vehicles), or the like.

The various system components, including but not limited to the SDN 112, the RSM 114, the respective SAs and so on, can include respective memories, respective processors, and/or respective data stores. The respective memories can be operatively connected to the respective processors. The respective memories and/or the respective data stores can store executable instructions that, when executed by the respective processors can facilitate performance of operations. Further, the respective processors can be utilized to execute computer executable components stored in the respective memories and/or the respective data stores.

For example, the respective memories can store protocols associated with facilitating dynamic bandwidth allocation as discussed herein. Further, the respective memories can facilitate action to control communication between the system 800, other systems, equipment, network equipment, and/or user equipment such that the system 800 can employ stored protocols and/or processes to facilitate dynamic bandwidth allocation as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory.

The respective processors can perform dynamic bandwidth allocation as discussed herein. The respective processors can be processors dedicated to analyzing and/or generating information received, processors that controls one or more components of the system 800, and/or processors that both analyzes and generates information received and controls one or more components of the system 800.

Described herein are systems, methods, articles of manufacture, non-transitory machine-readable medium, and other embodiments or implementations that can facilitate radio access network on-demand dynamic bandwidth allocation in advanced networks, as discussed herein. For example, provided herein is on-demand dynamic slice bandwidth allocation by leveraging analytics enabled SDN employing fast and secure quantum links. More specifically, this provided herein are efficient embodiments that allocate required slice bandwidth on-demand by leveraging analytics-backed SDN that determines the available unused bandwidth for inter-slice and intra-slice clusters by at least continual real time monitoring and analyzing current and projected traffics for any specific slice in the RAN. Then the SDN allocates the needed bandwidth to end users (UEs) by interacting with the RAN slice agent and/or RAN slice manager over a fast and secure connection employing QKD link protocol.

Figure 9:
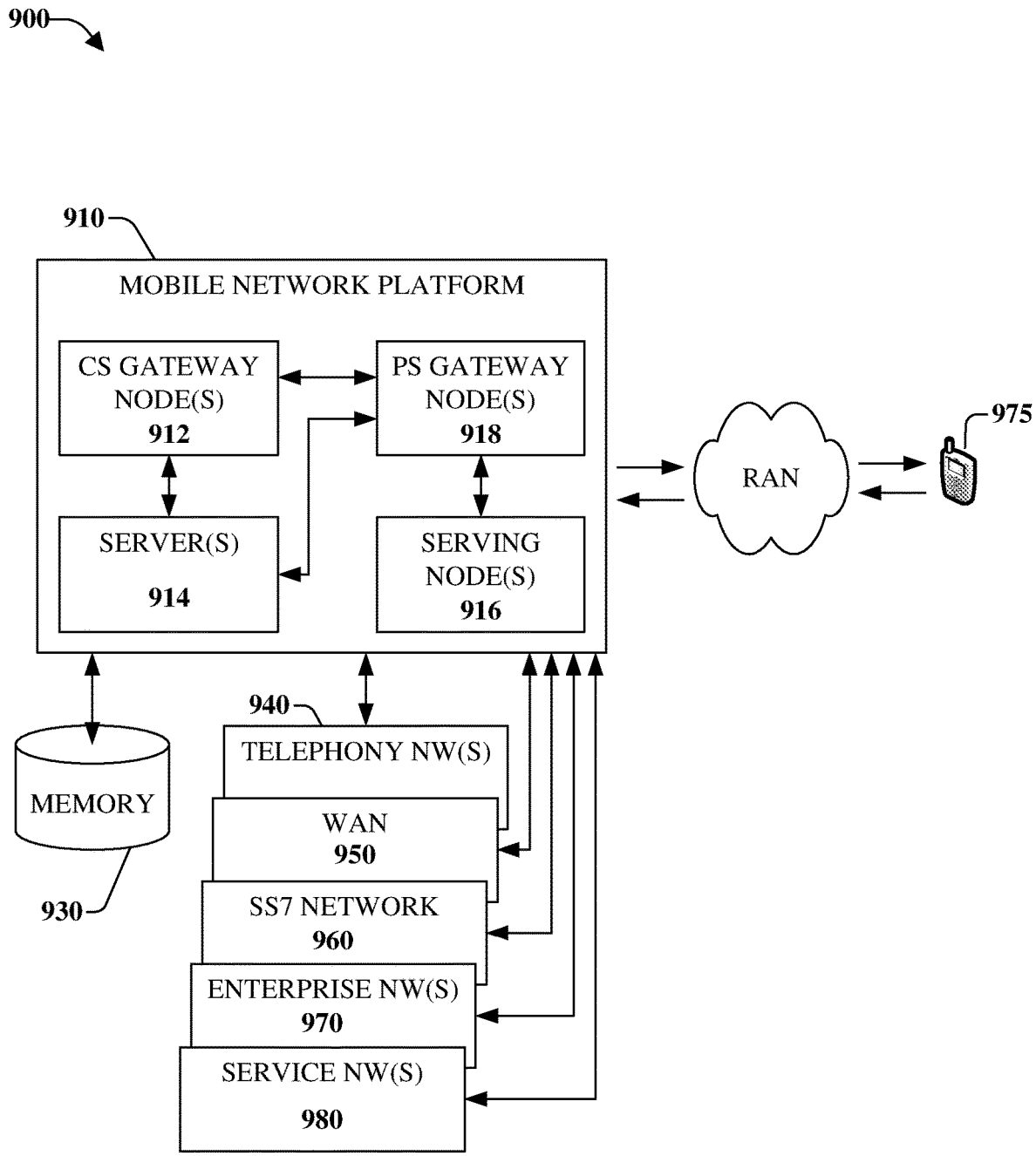
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks such as telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) such as IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless network platform 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
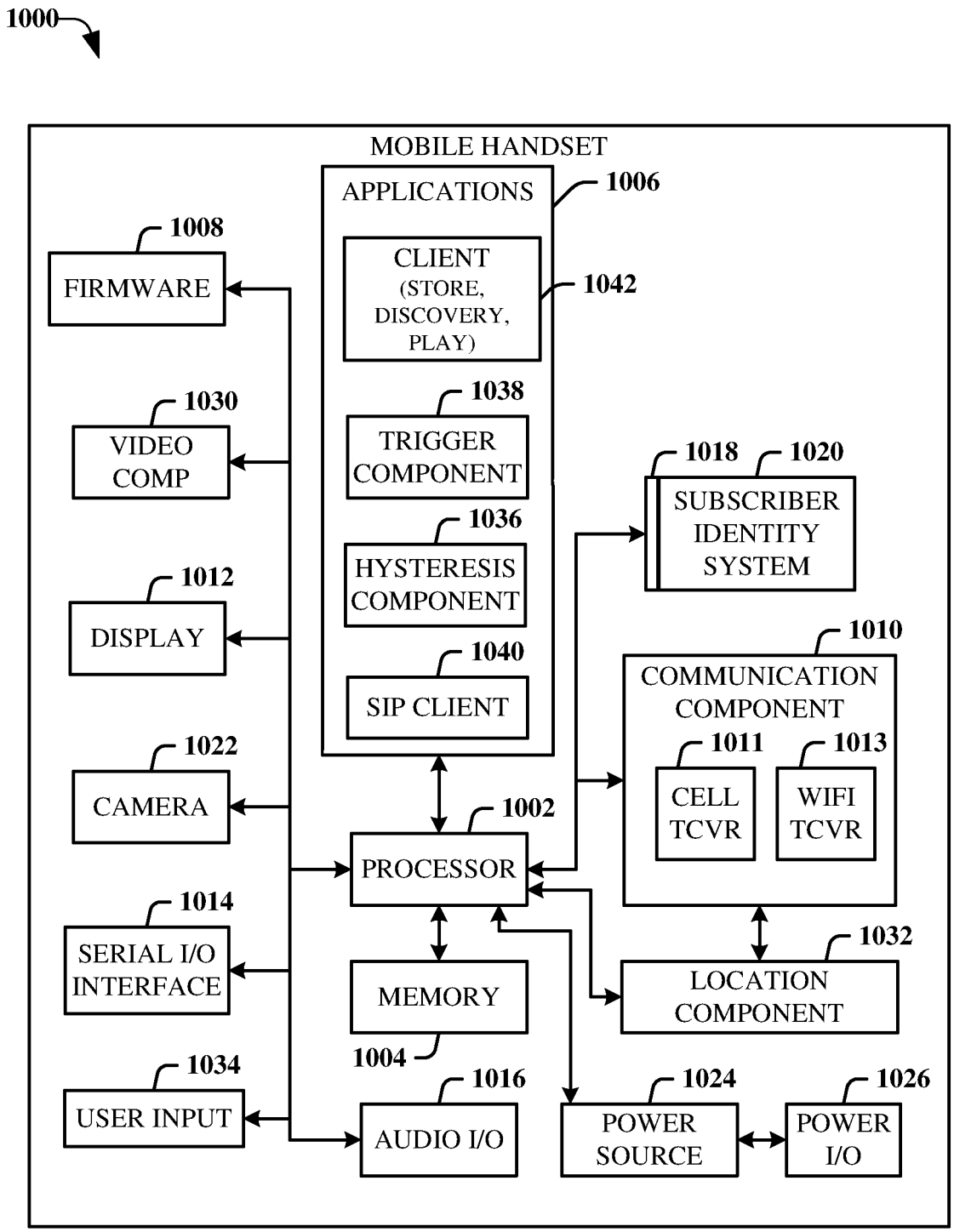
FIG. 10 illustrates an example, non-limiting, block diagram of a handset operable to engage in a system architecture that facilitates wireless communications according to one or more embodiments described herein.

Referring now to FIG. 10, illustrated is an example, non-limiting, block diagram of a handset 1000 operable to engage in a system architecture that facilitates wireless communications according to one or more embodiments described herein. Although a mobile handset is illustrated herein, it will be understood that other devices can be a mobile device and/or user equipment, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, main-frame computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power 110 component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touchscreen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for a dual-mode GSM handset. The handset 1000 can accommodate at least satellite radio services through a handset that can combine wireless voice and digital radio chipsets into a single handheld device.

Figure 11:
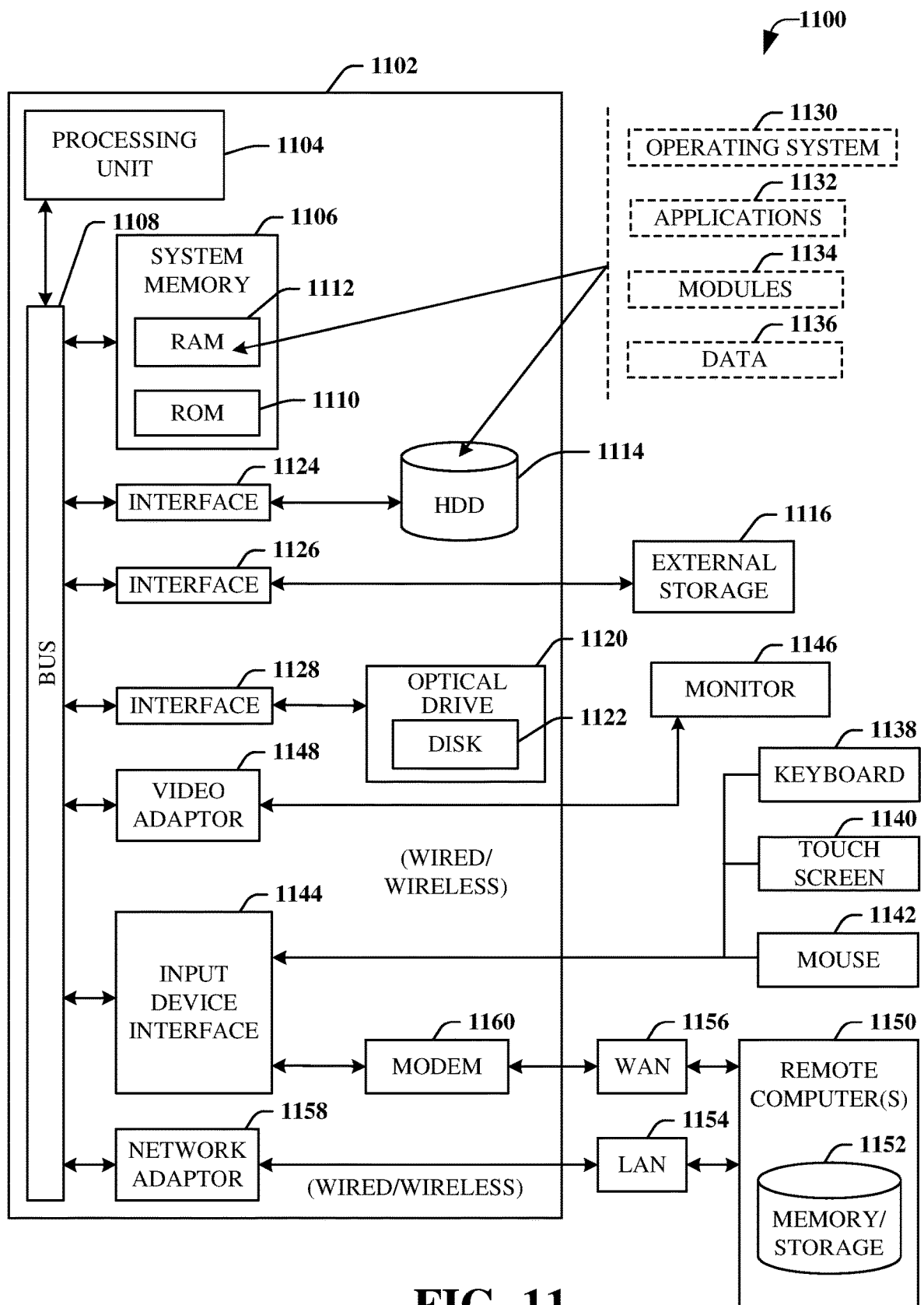
FIG. 11 illustrates an example, non-limiting, block diagram of a computer operable to engage in a system architecture that facilitates wireless communications according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A Basic Input/Output System (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and a drive 1120, e.g., such as a solid state drive, an optical disk drive, which can read or write from a disk 1122, such as a CD-ROM disc, a DVD, a BD, etc. Alternatively, where a solid state drive is involved, disk 1122 would not be included, unless separate. While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and drive 1120 can be connected to the system bus 1108 by an HDD interface 1124, an external storage interface 1126 and a drive interface 1128, respectively. The interface 1124 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally include emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can include one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, stand-alone, executable packages of software that include, e.g., code, runtime, system tools, system libraries and settings for an application.

Further, computer 1102 can be enable with a security module, such as a trusted processing module (TPM). For example, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above, such as but not limited to a network virtual machine providing one or more aspects of storage or processing of information. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2

(3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method comprising:
based on a first determination that available network slice resources fail to satisfy a criterion associated with a user equipment parameter associated with a user equipment, invoking, by a network equipment comprising a processor, a reallocation procedure, wherein the reallocation procedure comprises:
based on an inter-slice functionality being activated in a slicing parameterization, determining, by the network equipment, that at least one network slice of respective network slices of the available network slice resources has available unused resource blocks;
extracting, by the network equipment, a defined amount of resource blocks from one or more of the respective network slices of the available network slice resources; and
based on a second determination that, after the extracting, a sum of unused resource blocks of the respective network slices satisfy the criterion associated with the user equipment parameter, discontinuing, by the network equipment, the extracting of the defined amount of resource blocks.

2. The method of claim 1, wherein the network equipment is a first network equipment, and wherein the method further comprises:
prior to the extracting, determining, by the first network equipment, that the inter-slice functionality is not enabled in the slicing parameterization; and
facilitating, by the first network equipment, a transmission of an instruction to the user equipment, wherein the instruction directs the user equipment to a second network equipment.

3. The method of claim 1, wherein the extracting is based on a defined slice weight of each of the respective network slices.

4. The method of claim 1, wherein the user equipment is a first user equipment, wherein the first user equipment and a second user equipment are serviced by a network slice of the available network slice resources, and wherein the method further comprises:
determining, by the network equipment, that an intra-slice sharing is activated; and
reconfiguring, by the network equipment, resource blocks of the network slice and a scheduling procedure between the first user equipment and the second user equipment.

5. The method of claim 4, further comprising:
obtaining, by the network equipment, information indicative of settings associated with a parameterization that is defined based on the reconfiguring; and
applying, by the network equipment, the parameterization at the available network slice resources.

6. The method of claim 1, further comprising:
prior to the invoking, identifying, by the network equipment, the available network slice resources; and
based on a defined granularity level, performing, by the network equipment, a fronthaul network slicing configuration.

7. The method of claim 6, wherein the performing occurs during a background mode, resulting in a reduced processing load consumed by the network equipment.

8. The method of claim 1, further comprising:
initiating, by the network equipment, a quantum key distribution link protocol; and
establishing, by the network equipment, a quantum channel among the network equipment.

9. The method of claim 8, wherein the establishing comprises establishing the quantum channel via a satellite link.

10. The method of claim 8, wherein the establishing comprises establishing the quantum channel via a fiber link.

11. A system, comprising:
a processor; and
a memory that stores executable instructions that, when executed by the processor, facilitate performance of operations, the operations comprising:
determining that a group of network slice resources associated with a network equipment fails to satisfy a specification applicable to a user equipment;
determining an inter-slice functionality is enabled in a slicing parameterization;
based on the slicing parameterization being enabled, determining that a first network slice resource of the group of network slice resources has first available unused resource blocks and that a second network slice resource of the group of network slice resources has second available unused resource blocks;
extracting a first group of resource blocks from the first network slice resource of the group of network slice resources; and
reallocating the first group of resource blocks to the second network slice resource of the group of network slice resources, wherein a combination of the first group of resource blocks and a second group of resource blocks of the second network slice resource is determined to satisfy the specification applicable to the user equipment.

12. The system of claim 11, wherein the extracting of the first group of resource blocks is based on a defined slice weight of the first group of resource blocks as compared to a total amount of resource blocks available at the first network slice resource.

13. The system of claim 11, wherein the user equipment is a first user equipment, and wherein the operations further comprise:
determining that an intra-slice sharing among the first user equipment and a second user equipment has been activated; and
reconfiguring a scheduling procedure associated with the combination of the first group of resource blocks and the second group of resource blocks between the first user equipment and the second user equipment.

14. The system of claim 11, wherein the operations further comprise:
initiating a quantum key distribution link protocol at the network equipment; and
establishing a quantum channel between the network equipment.

15. The system of claim 11, wherein the network equipment is configured to operate according to at least a fifth generation network communication protocol.

16. The system of claim 11, wherein the network equipment is configured to operate according to a sixth generation network communication protocol.

17. A non-transitory machine-readable medium, comprising executable instructions that, when executed by a processor of a network equipment, facilitate performance of operations, the operations comprising:
based on a first determination that available network slice resources fail to satisfy a criterion associated with a user equipment parameter associated with a user equipment, invoking a reallocation procedure, wherein the reallocation procedure comprises:
based on an inter-slice functionality being activated in a slicing parameterization, determining that at least one network slice of respective network slices of the available network slice resources has available unused resource blocks;
extracting a defined amount of resource blocks from one or more of the respective network slices of the available network slice resources; and
based on a second determination that, after the extracting, a sum of unused resource blocks of the respective network slices satisfy the criterion associated with the user equipment parameter, discontinuing the extracting of the defined amount of resource blocks.

18. The non-transitory machine-readable medium of claim 17, wherein the network equipment is a first network equipment, and wherein the operations further comprise:
prior to the extracting, determining, by the first network equipment, that the inter-slice functionality is not enabled in the slicing parameterization; and
facilitating, by the first network equipment, a transmission of an instruction to the user equipment, wherein the instruction directs the user equipment to a second network equipment.

19. The non-transitory machine-readable medium of claim 17, wherein the extracting is based on a defined slice weight of each of the respective network slices.

20. The non-transitory machine-readable medium of claim 17, wherein the user equipment is a first user equipment, wherein the first user equipment and a second user equipment are serviced by a network slice of the available network slice resources, and wherein the operations further comprise:
determining that an intra-slice sharing is activated; and
reconfiguring resource blocks of the network slice and a scheduling procedure between the first user equipment and the second user equipment.

* * * * *